United States Patent
Bucci et al.

[11] Patent Number: 5,947,153
[45] Date of Patent: Sep. 7, 1999

[54] FUEL TANK FILLER NECK WITH BYPASS PASSAGE

[75] Inventors: George H. Bucci, South Windsor; Mark R. Johansen, Cheshire; Timothy P. Neal, Harwington, all of Conn.

[73] Assignee: Walbro Corporation, Cass City, Mich.

[21] Appl. No.: 08/938,588

[22] Filed: Sep. 26, 1997

[51] Int. Cl.⁶ .................................................. B65B 39/00
[52] U.S. Cl. ..................... 137/588; 137/587; 141/324; 141/59
[58] Field of Search ........................... 137/587, 588; 141/312, 348, 324, 59

[56] References Cited

U.S. PATENT DOCUMENTS

| | | | |
|---|---|---|---|
| 4,768,566 | 9/1988 | Ito et al. | 137/588 X |
| 4,813,453 | 3/1989 | Jenkins et al. | 137/588 |
| 4,893,643 | 1/1990 | Gifford et al. | 137/588 X |
| 4,966,299 | 10/1990 | Teets et al. | 137/587 X |
| 5,322,100 | 6/1994 | Buechler et al. | 137/588 X |
| 5,363,889 | 11/1994 | Simpson et al. | 141/59 X |
| 5,435,356 | 7/1995 | Rabinovich | 141/59 |
| 5,439,129 | 8/1995 | Beuchler | 141/59 X |
| 5,538,055 | 7/1996 | Kunz et al. | 137/588 X |
| 5,669,361 | 9/1997 | Weissinger et al. | 137/587 X |
| 5,730,194 | 3/1998 | Foltz | 137/588 X |

*Primary Examiner*—John Rivell
*Assistant Examiner*—Meredith H. Schoenfeld
*Attorney, Agent, or Firm*—Reising, Ethington, Barnes, Kisselle, Learman & McCulloch, P.C.

[57] ABSTRACT

An improved filler neck for a fuel inlet of a vehicle fuel tank has a bend communicating with converging and diverging portions which control the flow of fuel through the filler neck to ensure that fuel flows through and downstream of the bend without backing up in the filler neck and actuating an automatic shutoff device of a refueling nozzle received in the filler neck. The filler neck also preferably has a bypass fuel passage through which fuel flows upstream through the filler neck and out to the atmosphere if a predetermined maximum pressure is exceeded within the fuel tank to limit the maximum pressure within the fuel tank and prevent it from being damaged or rupturing. Several angled ribs in the filler neck housing guide the refueling nozzle for proper positioning within the filler neck. Other ribs also provide gaps between the refueling nozzle and the filler neck housing to prevent the refueling nozzle from sealing the filler neck inlet. Slots at the nozzle interface provide a vent area to prevent a vacuum from being generated in the filler neck even when used with a refueling nozzle designed to provide a vapor tight seal at the refueling inlet to prevent liquid fuel from being drawn upstream through the filler neck and thereby prematurely activating the automatic shutoff device of the refueling nozzle.

27 Claims, 3 Drawing Sheets

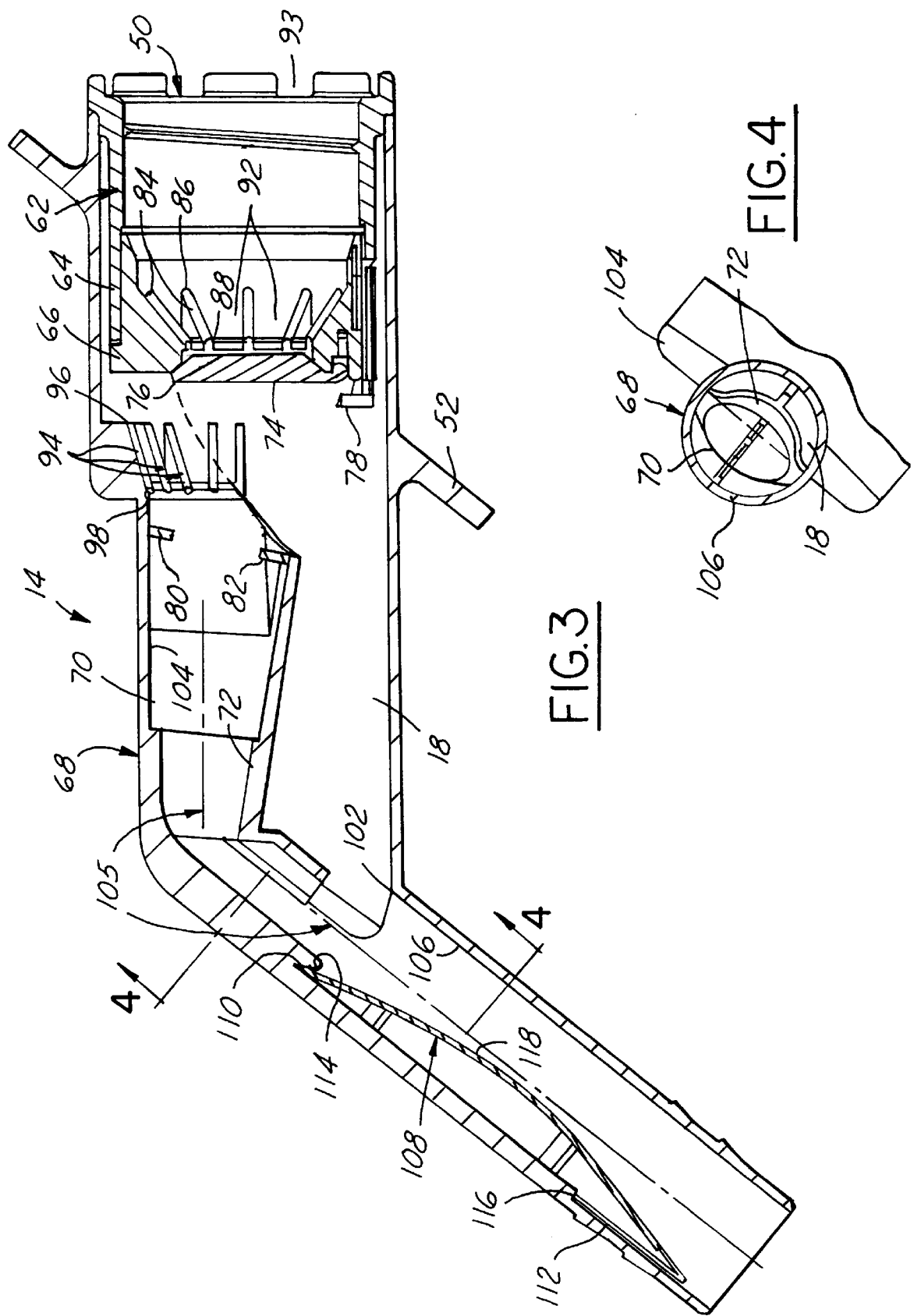

even when used with a refueling nozzle designed to provide
FUEL TANK FILLER NECK WITH BYPASS PASSAGE

FIELD OF THE INVENTION

This invention relates generally to fuel tanks and more particularly to an improved filler neck construction for a fuel tank.

BACKGROUND OF THE INVENTION

As concern for protection of the environment increases, regulations for preventing the escape to the atmosphere of volatile hydrocarbon fuel vapors are being promulgated by governmental agencies. One source of these hydrocarbon vapors is the fuel tanks of vehicles using gasoline or other hydrocarbon fuels of high volatility. With present automotive gas tank designs, fuel vapor can escape during the filling of the tanks and usually even after the tanks are filled. The use of an onboard vapor recovery system to remove excess fuel vapor from the fuel tank is one solution to the problem. Some vapor recovery systems utilize a vapor vent valve located near the top of the fuel tank through which fuel vapor flows to a vapor canister downstream of the vent valve when it is open. Typically, the vapor vent valve is responsive to the level of fuel in the tank and when a desired maximum level of fuel in the tank is reached during filling of the tank, the vapor vent valve is closed thereby increasing the pressure within the fuel tank to actuate an automatic shutoff device in the refueling nozzle.

The fuel dispensing nozzle of a typical station fuel pump has an automatic shutoff which is actuated by liquid fuel rising sufficiently in the fill tube of the fuel tank to at least momentarily cover and close off a control port immediately adjacent the outlet end of the dispensing nozzle. Closing this control port causes a vacuum actuated diaphragm and valve to automatically shut off the discharge of liquid fuel from the dispensing nozzle. During refueling of the fuel tank, there is the potential danger of over-pressurizing and even rupturing the fuel tank. Of particular concern is the failure of the automatic shutoff device of a fuel pump refueling nozzle to activate despite increasing pressure within the fuel tank. Most refueling pumps can supply fuel at a pressure that is more than enough to rupture the fuel tank and thus, the fuel tank can be over pressurized and damaged if the automatic shutoff device fails to operate.

Further, some filler neck designs for vehicle fuel tanks do not achieve a liquid seal during filling, especially at low fuel flow rates. If a sufficient liquid seal is not present during the refueling process, fuel vapors can recirculate back up through the filler neck and escape into the atmosphere. In addition, some refueling nozzles are designed to provide a vapor tight seal at the filler neck inlet during refueling. Typically, these nozzles also generate a vacuum or negative pressure to draw fuel vapors therein. If the vapor recovery system is not properly designed, the vacuum generated can draw liquid fuel back up the filler neck to the refueling nozzle which may then activate the automatic shutoff and prematurely terminate refueling.

SUMMARY OF THE INVENTION

An improved filler neck for a fuel inlet of a vehicle fuel tank has a bend communicating with converging and diverging portions which control the flow of fuel through the filler neck to ensure that fuel flows through and downstream of the bend without backing up in the filler neck and actuating an automatic shutoff device of a refueling nozzle received in the filler neck. The filler neck also preferably has a bypass fuel passage through which fuel flows upstream through the filler neck and out to the atmosphere if a predetermined maximum pressure is exceeded within the fuel tank to limit the maximum pressure within the fuel tank and prevent it from being damaged or rupturing. Several angled ribs in the filler neck housing guide the refueling nozzle for proper positioning within the filler neck. Other ribs also provide gaps between the refueling nozzle and the filler neck housing to prevent the refueling nozzle from sealing the filler neck inlet. Slots at the nozzle interface provide a vent area to prevent a vacuum from being generated in the filler neck a vapor tight seal at the refueling inlet to prevent liquid fuel from being drawn upstream through the filler neck and thereby prematurely activating the automatic shutoff device of the refueling nozzle.

The filler neck housing properly positions the refueling nozzle therein to provide a desired fuel flow through an angled passage having an included angle not less than 100° without excessively turbulent flow or other detrimental flow problems. This sharply angled passage permits the filler neck housing to be compact and versatile such that it may be readily incorporated into automotive applications. Further, a flow conditioning insert is preferably disposed in the filler neck housing downstream of the angled portion of the fuel passage to ensure that even at fuel flow rates as low as 2.5 gallons per minute, the entire cross sectional area of the fuel passage is wetted to provide a liquid seal to prevent the recirculation or backflow of fuel vapor through the filler neck.

Objects, features and advantages of this invention include providing an improved filler neck for a vehicle fuel tank which limits the maximum pressure within the fuel tank, provides a liquid seal even at low fuel flow rates, properly positions a refueling nozzle therein to permit flow through a relatively sharply bent fuel flow passage without excessive turbulence, provides a simplified packaging to permit use with various automotive applications, prevents a vapor-tight seal between a refueling nozzle and the filler neck housing, provides a vent passage adjacent to the refueling nozzle to prevent a vacuum from being generated within the filler neck housing, prevents premature activation of the automatic shutoff sensor of the refueling nozzle, is durable, reliable, of relatively simple design and economical manufacture and assembly, and has a long, useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 3 is a sectional view of the filler neck housing taken along line 3—3 of FIG. 2;

FIG. 4 is a sectional view of the filler neck housing taken along line 4—4 of FIG. 3.

DETAILED DESCRIPTION OF THE PREFERRED EMBODIMENTS

Figure 1:
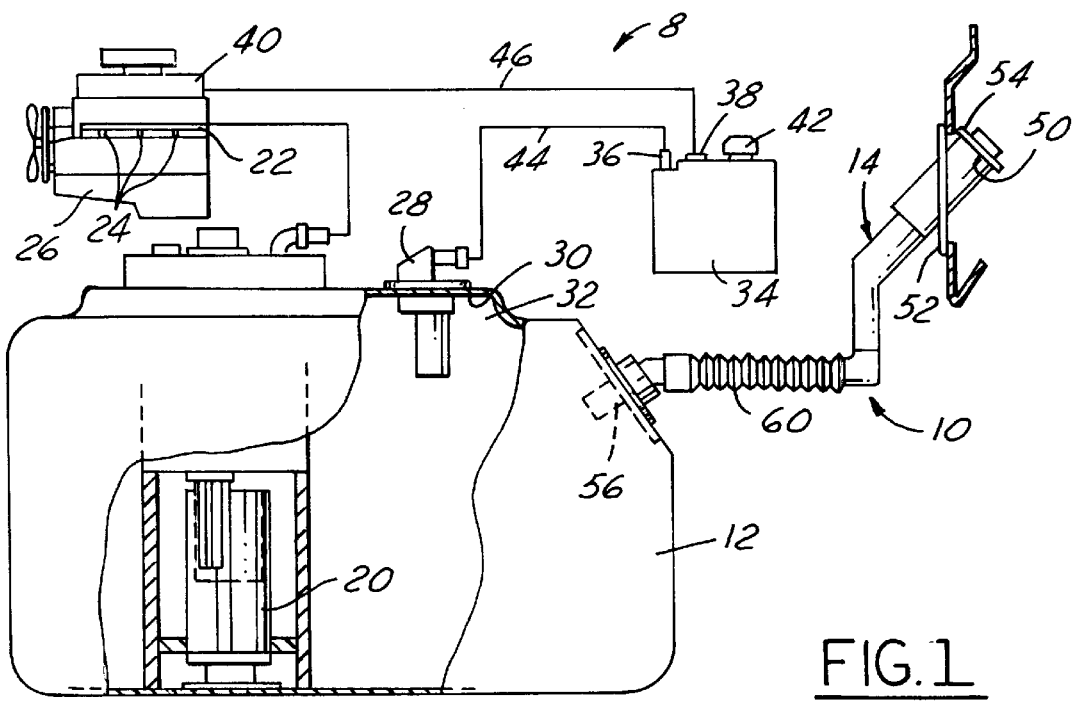
FIG. 1 is a semi-diagrammatic view of a vehicle fuel system with a fuel tank with a filler neck housing embodying this invention.
Figure 2:
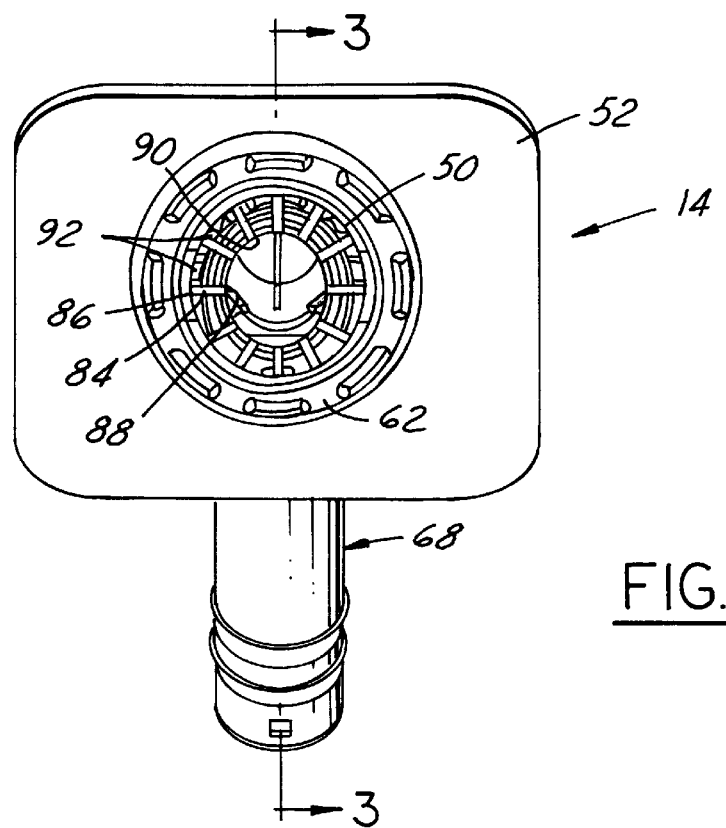
FIG. 2 is an end view of the filler neck housing embodying this invention.

Referring in more detail to the drawings, FIG. 1 illustrates a portion of a vehicle fuel system 8 wherein a fill pipe 10 of a fuel tank 12 has a filler neck 14 (FIGS. 2–5) constructed to receive a refueling nozzle 16 (FIG. 5) of a fuel station fuel pump and having a bypass passage 18 through which fuel is discharged from the fill pipe 10 when the pressure within the fuel tank 12 exceeds a predetermined maximum level. An electric motor driven fuel pump 20 is disposed in the fuel tank 12 and draws fuel from the fuel tank 12 and delivers it under pressure to a fuel rail 22 having a plurality of fuel injectors 24 through which fuel is delivered to an internal combustion engine 26. A fuel vapor control unit 28 having a vapor vent valve therein is disposed adjacent the upper wall 30 of the fuel tank 12 and preferably within a well-defined vapor dome 32, to selectively communicate fuel vapor within the fuel tank 12 with a fuel vapor canister 34 downstream of the control unit 28. Typically, the vapor canister 34 is filled with activated charcoal (preferably grade 15) to absorb the hydrocarbon vapors received from the control unit 28 through an inlet port 36 and to discharge the vapor through an outlet or purge port 38 into the intake manifold 40 of the engine 26 when operating. The interior of the vapor canister 34 is vented to the atmosphere through a port 42 in the top of the canister 34 and in some applications, a check valve prevents reverse flow of the fuel vapor through the port to the atmosphere. The vapor canister 34 is mounted in the vehicle and is connected to the control unit 28 and the intake manifold 40 by suitable flexible hoses 44 and 46.

The filler neck 14 has an inlet 50 disposed vertically above the top of the tank 12 and received in an access pocket of the vehicle. To facilitate packaging within an automotive body, the filler neck 14 has an integral flange 52 which facilitates the mounting of the filler neck 14 to the inside fender well of an automobile and properly positions the inlet 50 for receiving the refueling nozzle pursuant to SAE J1140 FEB88. The inlet 50 is closed and sealed by a removable gas cap 54 and may be configured and arranged to accept either a ¼ turn style gas cap or a threaded style gas cap.

To prevent the reverse flow of fuel from the tank 12 through the fill pipe 10, preferably a check valve 56 is located at the lower end of the fill pipe 10. The check valve 56 may be of the ball, flapper, disk, duck bill or other type of suitable check valve permitting the free and rapid flow of fuel through the fill pipe 10 and into the tank 12, and preventing reverse flow of fuel from the tank 12 through the fill pipe 10. A presently preferred flexible disk-type check valve is disclosed in U.S. patent application Ser. No. 08/428, 340, filed on Apr. 25, 1995, the disclosure of which is incorporated herein by reference and hence the check valve will not be described in further detail.

Preferably, the filler neck 14 is connected to the fuel tank 12 through a pleated flexible tube 60. Preferably, the inlet 50 of the filler neck is defined by a separate body 62 which is generally cylindrical with a sidewall 64 constructed to be either spin welded or otherwise sealed, such as by an O-ring, and fixed to an outer housing 68. A refueling nozzle receiving ring 66 is received in the end of body 62 and attached to it.

The filler neck housing 68 defines a fuel passage 70 which at one end communicates with a refueling nozzle 16 received through the inlet body 62 and at its other end communicates with the fuel tank 12 through the tube 60 of the fill pipe 10. An interior wall 72 of the filler neck housing 68 separates the fuel passage 70 from the bypass passage 18 so that under normal refueling conditions, fuel is admitted into the filler neck 14 only through the fuel passage 70. The bypass passage 18 opens into the fuel passage 70 at its downstream end 73 and at its upstream end communicates with the inlet 50 through a door 74 pivotally attached to the housing 68.

Figure 5:
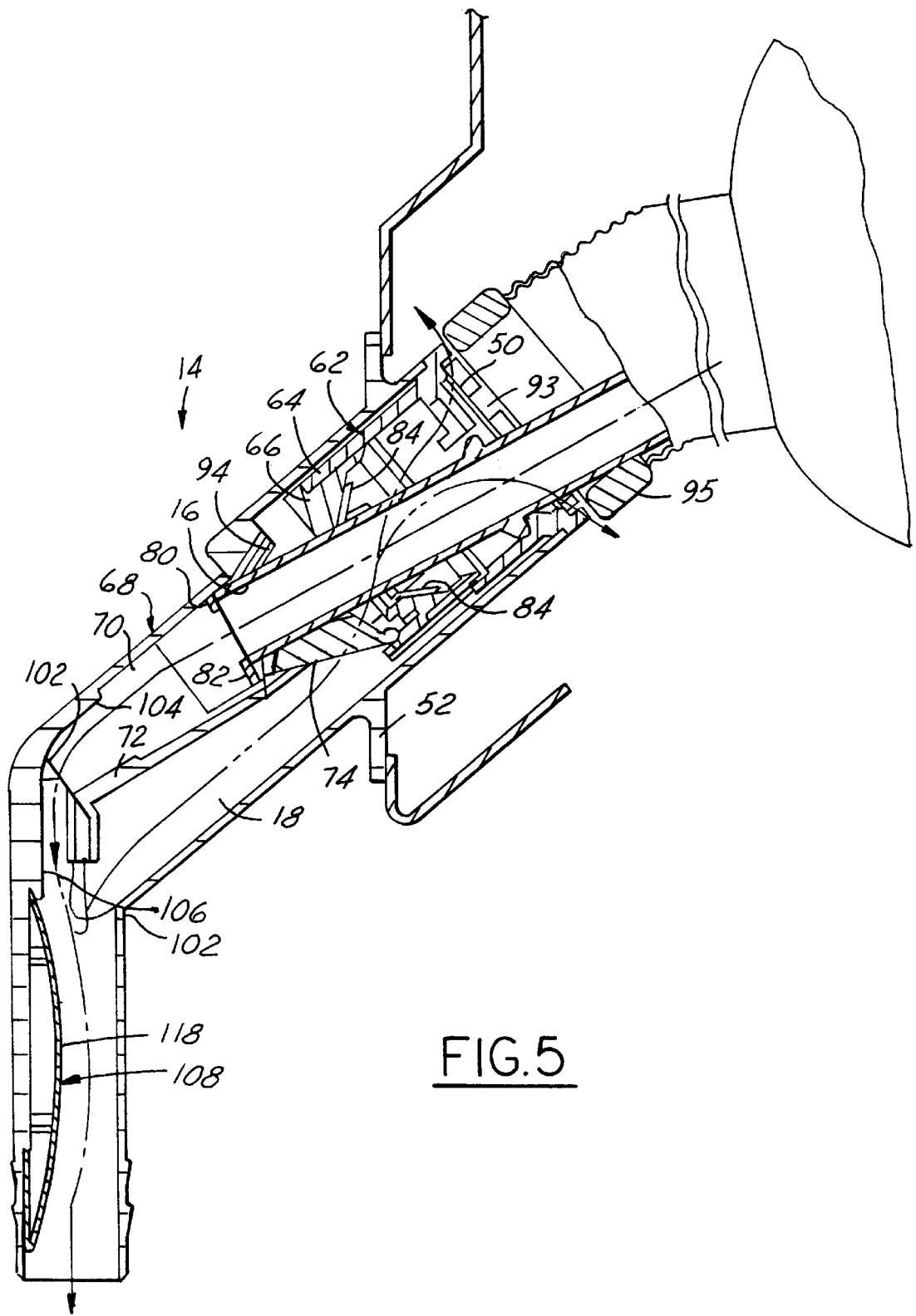
FIG. 5 is a sectional view of the filler neck housing illustrating a refueling nozzle received therein.

The door 74 is preferably spring biased to a closed position on a seat 76 of the refueling nozzle receiving ring 66 of the filler neck housing 68 and is moved to its open position by insertion of the refueling nozzle 16 through the refueling nozzle receiving ring 66. As shown in FIGS. 3 and 5, the door 74 pivots counterclockwise from its closed position (FIG. 3) to its open position (FIG. 5) such that it opens downwardly to bear on the lower portion of the refueling nozzle 16. When closed, the door 74 restricts the flow of fluid through the refueling nozzle receiving ring 66 and when open, the door 74 helps to position the refueling nozzle 16 within the fuel passage 70 and also to separate the bypass passage 18 from the fuel passage 70. A finger 78 of the ring 66 limits the opening of the door 74 to position the door 74 such that it engages and positively aligns the refueling nozzle 16 with the fuel passage 70 and provides support for the free end of the fuel nozzle. A pair of generally opposed ribs 80, 82, (FIG. 3) located within and extending generally radially inwardly of the fuel passage 70 are constructed to engage the end of the refueling nozzle 16 to provide a positive stop to limit the insertion of the refueling nozzle 16 into the fuel passage 70.

The refueling nozzle receiving ring 66 has a plurality of spaced apart ribs 84 which extend generally radially inwardly from their upstream end 86 to their downstream end 88 providing a converging opening 90 to guide and position the refueling nozzle 16 when inserted therethrough. The minimum diameter of the opening 90 is constructed to permit the insertion of an unleaded refueling nozzle but prevent insertion of diesel and leaded fuel refueling nozzles which are larger in diameter. Thus, in cooperation with the door 74 which when closed restricts flow through the opening 90, the refueling nozzle receiving ring 66 substantially restricts the flow of diesel or leaded fuels through the filler neck 14 and into the fuel tank 12. The ribs 84 also provide passages or gaps 92 between adjacent ribs 84 to prevent sealing engagement between the refueling nozzle 16 and the receiving ring 66. Slots 93 in the free end of the housing 62 provide passages preventing sealing engagement with the sealing ring 95 of the refueling nozzle 16 so that the interior of the housing 62 communicates with the exterior atmosphere when the fill cap is removed and the refueling nozzle 16 inserted therein. These gaps 92 and slots 93 prevent a vacuum from being generated in the fill pipe 10 which may cause premature actuation of the automatic shutoff device of the refueling nozzle 16 and also communicate the bypass passage 18 with the exterior of the fill pipe 10.

The filler neck housing 68 has a second set of ribs 94 downstream of the refueling nozzle receiving ring ribs 84 which are disposed along the upper portion of the upstream end of the fuel passage 70. The second set of ribs 94 also preferably extend generally radially inwardly from their upstream end 96 to their downstream end 98 to provide an opening 100 which converges into the fuel passage 70. As shown in FIG. 5, in cooperation with the door 74, the second set of ribs 94 accurately position the refueling nozzle 16 in the upstream end of the fuel passage 70 to provide the desired flow through the fuel passage 70 and to prevent fuel from being emitted from the refueling nozzle 16 directly into the bypass passage 18.

To facilitate mounting, in a vehicle, a bend 102 in the filler neck housing 68 disposes an upstream converging portion 104 of the housing 68 at an obtuse included angle in the range of 180° to 100° from a downstream diverging portion 106 of the filler neck housing 68. The construction of the filler neck 14 and the positive positioning of the refueling nozzle 16 therein enable use of a filler neck housing 68 with this relatively sharp bend 102 without excessive turbulent flow or other undesirable fuel flow characteristics. Specifically, the converging portion 104 and diverging, portion 106 are constructed to control the flow of fuel to ensure that fuel flows through the bend 102 without backing up in the filler neck and prematurely actuating the automatic shutoff of the refueling nozzle 16. To further condition the flow of fuel, a flow conditioning insert 108 is disposed in the fuel passage 70 downstream of the bend 102 and has its ends 110, 112 received in slots 114, 116 in the housing 68 with its outer surface 118 generally arcuate and bowed inwardly into the fuel passage 70 to direct fuel flow towards the opposite or surrounding wall of the fuel passage 70 and thereby insure that the entire cross sectional area of the fuel passage 70 is wetted to provide a liquid seal in the fuel passage. The liquid seal prevents the flow of fuel vapor from the fuel tank 12 upstream and beyond the liquid seal area and into the bypass passage 18 to prevent the discharge of the fuel vapors into the atmosphere during filling of the fuel tank 12.

OPERATION

Typical fuel pump refueling nozzles 16 have an automatic shutoff device which terminates the discharge of fuel from the nozzle 16 when the fuel tank 12 is full and fuel fills the fill pipe 10. When it is desired to add fuel to the fuel tank 12, a refueling nozzle 16 is inserted through the inlet 50 of the filler neck housing 68 and into the refueling nozzle receiving ring 66. The converging ribs 84 guide the refueling nozzle 16 through the opening 90 and onto the door 74 whereupon further insertion of the refueling nozzle 16 rotates the door 74 about its pivot to open it until the door 74 contacts the finger 78. The refueling nozzle 16 is received between the door 74 and the second set of ribs 94 to guide and position the refueling nozzle 16 within the fuel passage 70 until the refueling nozzle 16 engages the opposed ribs 80, 82 in the fuel passage 70 which limit its insertion. The refueling nozzle 16 is then actuated to discharge fuel from the nozzle 16 through the fuel passage 70 and fill pipe 10 into the fuel tank 12.

As the fuel level within the tank 12 rises, fuel vapor is displaced through the control unit 28 into the vapor canister 34 until a predetermined maximum level of fuel is reached within the fuel tank 12 whereupon the vapor vent valve closes to prevent liquid fuel from being discharged into the vapor canister 34. With the vapor vent valve closed, the pressure within the fuel tank 12 will increase as additional fuel is added to the tank 12. When the fuel tank 12 pressure is sufficiently high, liquid fuel will rise in the fill pipe 10 to at least momentarily cover and close off a control port immediately adjacent the outlet of the refueling nozzle 16 to actuate the automatic shutoff device of the refueling nozzle 16 and prevent further discharge of liquid fuel from the nozzle 16. The rising fuel in the fill pipe 10 also flows into the bypass passage 18 and if fuel is subsequently discharged from the nozzle 16, such as if the automatic shutoff device fails to activate, the fuel will rise through the bypass passage 18 and through the refueling nozzle receiving ring 66 of the filler neck housing, through the gaps 92 between the ribs 84 and finally out of the slots 93 of the inlet 50 of the housing 62. This prevents the over pressurization of the fuel tank 12 which can occur when the tank 12 is "over filled" and which may damage or even rupture the fuel tank 12. The discharge of liquid fuel from the bypass passage 18 out of the inlet 50 signals the operator of the fuel pump that the fuel tank 12 is full and that additional fuel should not be added to the fuel tank 12.

Thus, the filler neck 14 with the bypass passage 18 prevents the pressure within the fuel tank 12 from exceeding a predetermined maximum pressure to prevent the tank 12 from being damaged or ruptured. The filler neck 14 is further designed to positively position a refueling nozzle 16 therein to permit use of a relatively sharp bend 102 in the filler neck housing 68 so that the housing 68 may be compact and versatile to be used in various automotive applications. The filler neck 14 further has a flow conditioning insert 108 to insure a liquid seal is obtained even at fuel flow rates as low as 2.5 gallons per minute to prevent fuel vapors from escaping from the fuel tank 12 to the atmosphere during filling of the tank 12. The filler neck 14 also prevents sealing of the inlet 50 even when used with fuel pumps having refueling nozzles designed to provide a vapor tight seal adjacent the inlet 50 so that the bypass passage 18 may communicate with the exterior of the fill pipe 10 through the inlet 50.

We claim:

1. A fill pipe for a vehicle fuel tank comprising:

an inlet at the upstream end of the fill pipe constructed to receive a refueling nozzle through which fuel is discharged into the fill pipe;

a fuel passage defined in the fill pipe communicating the inlet with the fuel tank; and a bypass passage defined in the fill pipe and communicating the fuel tank with the exterior of the fill pipe and bypassing the outlet of the refueling nozzle when received in the fill pipe and an intermediate wall defining at least in part the bypass passage and separating the bypass passage from the outlet of a refueling nozzle received in the fill pipe, whereby if the pressure within the fuel tank reaches a predetermined maximum level during filling, fuel will flow upstream through the bypass passage which communicates with the exterior of the fill pipe to prevent the pressure in the fuel tank from exceeding said predetermined maximum level.

2. The fill pipe of claim 1 which also comprises a plurality of ribs downstream of the inlet which contact the refueling nozzle when it is received within the fill pipe to position the refueling nozzle within the fill pipe and also to prevent sealing engagement between the fill pipe and refueling nozzle by providing gaps therebetween.

3. The fill pipe of claim 2 wherein one end of the bypass passage communicates with the inlet through the gaps provided by the ribs between the refueling nozzle and the fill pipe.

4. The fill pipe of claim 2 which also comprises a second set of ribs downstream of the plurality of ribs and constructed to further position the outlet end of the refueling nozzle within the fill pipe to ensure that fuel discharged from the refueling nozzle initially flows into the fuel passage as opposed to the bypass passage.

5. The fill pipe of claim 4 which also comprises a door pivotally carried by the fill pipe and biased to a closed position bearing on a seat of the fill pipe to restrict fuel flow through the fuel passage and moveable to an open position spaced from the closed position by the refueling nozzle to permit a substantially unrestricted flow of fuel from the refueling nozzle to the fuel passage and in cooperation with the second set of ribs, positively positions the refueling nozzle within the fill pipe.

6. The fill pipe of claim 1 which also comprises a bend in the fill pipe disposing an upstream portion at an obtuse angle of between about 180° to 100° relative to a downstream portion of the fill pipe.

7. The fill pipe of claim 6 which also comprises a wall at least partially formed in the upstream portion and defining at least in part the bypass passage adjacent one side of the wall and defining at least in part the fuel passage adjacent the other side of the wall.

8. The fill pipe of claim 6 which also comprises a flow conditioning insert disposed in the fuel passage in the downstream portion of the fill pipe and constructed to direct the flow of fuel such that the entire cross-sectional area of the fuel passage downstream of the insert is wetted by liquid fuel to provide a liquid seal in the fuel passage even with a low fuel flow rate which prevents fuel vapor from traveling upstream of the liquid seal and through the bypass passage.

9. The fill pipe of claim 8 wherein the insert is constructed and arranged to restrict the fuel passage sufficiently to provide a liquid seal of the fuel passage at a fuel flow rate as low as 2.5 gallons per minute.

10. The fill pipe of claim 6 wherein the obtuse angle between the upper and lower portions is between about 120° and 160°.

11. The fill pipe of claim 6 wherein the obtuse angle between the upper and lower portions is approximately 135°.

12. The fill pipe of claim 1 which also comprises a door pivotally carried by the fill pipe and biased to its closed position on a seat of the fill pipe to restrict fuel flow through the fuel passage and moveable to its open position, spaced from the seat, by a refueling nozzle inserted at least partially into the fuel passage.

13. The fill pipe of claim 12 wherein the door, when open, is disposed generally between the fuel passage and the bypass passage to separate the nozzle from the bypass passage.

14. The fill pipe of claim 1 which also comprises a stop disposed within the fuel passage to limit the insertion of a refueling nozzle.

15. The fill pipe of claim 1 wherein the inlet is constructed to permit insertion of unleaded refueling nozzles but prevent insertion of leaded or diesel refueling nozzles.

16. The fill pipe of claim 1 wherein the seat has a diameter larger than the diameter of a conventional refueling nozzle for unleaded fuel and smaller than the diameter of a conventional refueling nozzle for leaded and diesel fuels.

17. The fill pipe of claim 16 wherein the door and seat are constructed and arranged so that the door will not be opened by attempting to insert into the fuel passage a refueling nozzle for leaded or diesel fuels.

18. The fill pipe of claim 1 wherein the fuel passage has a converging portion of the fuel passage downstream of the outlet of a refueling nozzle when received in the fill pipe, a diverging portion downstream of the converging portion and a bend formed generally between the converging portion and the diverging portion, and disposing the converging portion at an obtuse included angle of about between 160° to 100° relative to the diverging portion.

19. The fill pipe of claim 1 comprising a door pivotally carried by the fill pipe and biased to a closed position bearing on a seat of the fill pipe to restrict fuel flow through the fuel passage and moveable to an open position spaced from the closed position by the refueling nozzle to permit a substantially unrestricted flow of fuel from the refueling nozzle to the fuel passage, and a stop carried by the fill pipe and constructed to limit the movement of the door away from said seat of the fill pipe so that the door engages and at least in part positions the refueling nozzle within the fill pipe.

20. The fill pipe of claim 19 which also comprises a plurality of ribs downstream of the door at least when the door is in its closed position which, in cooperation with the door, are constructed to positively position the refueling nozzle within the fill pipe.

21. The fill pipe of claim 20 wherein a stop is disposed downstream of said ribs and is constructed to bear on the refueling nozzle to limit the insertion of the refueling nozzle into the fill pipe.

22. A fill pipe for a vehicle fuel tank comprising:

an inlet at the upstream end of the fill pipe constructed to receive a refueling nozzle through which fuel is discharged into the fill pipe;

a fuel passage defined in the fill pipe communicating the inlet with the fuel tank and having a converging portion of the fuel passage downstream of the outlet of a refueling nozzle when received in the fill pipe, a diverging portion downstream of the converging portion and a bend formed generally between the converging portion and the diverging portion disposing the converging portion at an obtuse included angle of about between 160° to 100° relative to the diverging portion whereby the converging portion and diverging portion are constructed and arranged to control the flow of fuel so that fuel flows through and downstream of the bend without backing up in the fuel passage and actuating an automatic shutoff device of a refueling nozzle received in the fill pipe.

23. The fill pipe of claim 22 which also comprises a flow conditioning insert disposed in the fuel passage downstream of the bend and constructed to direct the flow of fuel such that the entire cross-sectional area of the fuel passage downstream of the insert is wetted by liquid fuel to provide a liquid seal in the fuel passage even with a low fuel flow rate which prevents fuel vapor from traveling upstream of the liquid seal and through the bypass passage.

24. The fill pipe of claim 23 wherein the insert is constructed and arranged to restrict the fuel passage sufficiently to provide a liquid seal of the fuel passage at a fuel flow rate as low as 2.5 gallons per minute.

25. The fill pipe of claim 22 which also comprises a bypass passage defined in the fill pipe and communicating the fuel tank with the exterior of the fill pipe so that if the pressure within the fuel tank reaches a predetermined maximum level during filling, fuel will flow upstream through the bypass passage and out of the fill pipe to prevent the pressure in the tank from exceeding said predetermined maximum level.

26. The fill pipe of claim 22 wherein the upstream end of the converging portion has a cross-sectional area which is about between 3 to 6 times that of the downstream end of the converging portion.

27. The fill pipe of claim 26 wherein the upstream end of the converging portion has a cross-sectional area about 4 times that of the downstream end of the converging portion.

\* \* \* \* \*